July 21, 1942.  W. A. GRAHAM  2,290,684
PHOSPHOROUS COPPER ALLOY
Filed July 31, 1940   2 Sheets-Sheet 2

WITNESSES:
E. C. Fiding
F. Shapot

INVENTOR
Walter A. Graham
BY Ezra W. Savage
ATTORNEY

Patented July 21, 1942

2,290,684

UNITED STATES PATENT OFFICE 2,290,684

PHOSPHOROUS COPPER ALLOY

Walter A. Graham, Pittsburgh, Pa., assignor to Westinghouse Electric & Manufacturing Company, East Pittsburgh, Pa., a corporation of Pennsylvania Application July 31, 1940, Serial No. 348,809

6 Claims. (Cl. 75—153)

This invention relates to brazing solders and more particularly to a brazing solder of phosphorous and copper having a predetermined ductility.

The patent to Jesse L. Jones, No. 1,651,709, of December 6, 1927, disclosed a phosphorous copper brazing solder which had lower melting point characteristics than that possessed by most of the hard solders known at that time. In particular, the eutectic comprising 8.27% of phosphorous reduced the melting point of pure copper from 1083° C. to about 707° C. in the eutectic. This reduction in temperature of about 375° C. is quite important in the art of brazing solders as disclosed in the patent.

In order to apply phosphorous copper alloys such as that disclosed by Jones to commercial use, it is necessary to produce strips in wire or rod form of suitable cross-sectional shape in order that craftsmen may apply it to the work. Numerous patents have since followed Jones detailing various methods of producing such wire or rod material. The main characteristic of the phosphorous copper alloy strips detracting from their value for some applications as produced by these various methods, is their extreme brittleness. Slight bending is sufficient to cause a shattering and cracking of the rods or wires. Numerous attempts have been made to produce a fabricated phosphorous copper alloy which has a greater degree of ductility than possessed heretofore. Critical heat treatments and involved hot rolling schedules have been resorted to in order to improve the ductility of strip phosphorous copper alloy. Generally speaking, these attempts have met with but little success.

Phosphorous copper alloys suitable for certain applications whether the material in the form of wire or rod does not need to be bent in order to be applied to the work is usually produced by hot rolling. In addition to its brittleness, the hot rolled material suffers from the defect that its surface is rough and includes considerable quantities of rolled in oxide and scale. Defects in the original ingot are carried into the finished rod by the rolling operation. Accordingly, while the phosphorous copper alloy possesses the good temperature characteristics desired, its field of application is limited due to the above recited characteristics.

The object of this invention is to provide for a ductile phosphorous copper alloy.

A further object of this invention is to provide for a smooth, scale-free ductile brazing rod of phosphorous copper alloys.

An additional object of this invention is to provide for producing a strip of predetermined cross-section having good ductility in a single extruding operation.

Other objects of the invention will be obvious from the specification and the claims, as will be more fully disclosed herein.

For a fuller understanding of the nature and objects of the invention, reference may be had to the following detailed description taken in conjunction with the accompanying drawings, in which.

The production of commercial strips of phosphorous copper hard solder suitable for various brazing purposes has been accomplished in the prior art by a complicated schedule of heat treatments and hot rolling operations. The cost of the material has been adversely affected by the considerable amount of work necessary to produce commercial strip. In spite of the involved operations and the high cost, the final product of hot rolling was characterized by a rough outer surface showing scale and oxide. In addition, the fundamental defect present in phosphorous copper material heretofore produced, namely, extreme brittleness, was present. This brittleness limited the application of the brazing strips to locations where substantially straight brazing shapes could be applied. Thus remote locations requiring a deformation of the strip into a bent rod were inaccessible to the welder or brazer. Other desirable phosphorous copper solder applications, as in rings for pipe soldering, were beyond the scope of hot rolled strip.

It has been discovered that the phosphorous copper may be made into strips of predetermined shape from ingots in a single relatively simple operation. In addition, this single operation imparts a degree of ductility hitherto thought impossible or unattainable for phosphorous copper alloy. The strips have a smooth clean surface free from any embedded scale or other foreign matter. Defects in the ingot, such as seams, slivers, cracks and blow holes do not carry over into the strip produced by the single operation.

According to this invention, ingots of phosphorous copper alloy are extruded within a range of temperatures to produce a strip of predetermined shape having clean surfaces, good mechanical structure and a predetermined high ductility.

Ingots suitable for the extrusion operation may be produced by melting copper in a suitable furnace, such as an electrical furnace. A predetermined amount of stick phosphorous is plunged into the molten copper in order to produce a composition having the desired amount of phosphorus. In some instances, a master alloy of phosphorous copper having 15% of phosphorus, for example, may be added to the molten copper in order to produce the desired alloy. The melt is given a few tenths of a per cent of phosphorus greater than that desired in the final strip. This is necessary due to the oxidation of phosphorus by the atmosphere.

After preparing a melt having the desired proportion of phosphorus, the molten material is cast in sand molds into ingots or slugs of a shape suitable for admission into the extrusion chamber of the apparatus. The solidified ingots are cleansed of sand and other surface debris in a water tumble. The clean slugs are ingots of several pounds weight, depending on the size of the extrusion press, are reheated to a temperature within the range of 300° C. to 675° C. and placed within an extrusion press 10 such as shown in Fig. 1.

Figure 1:
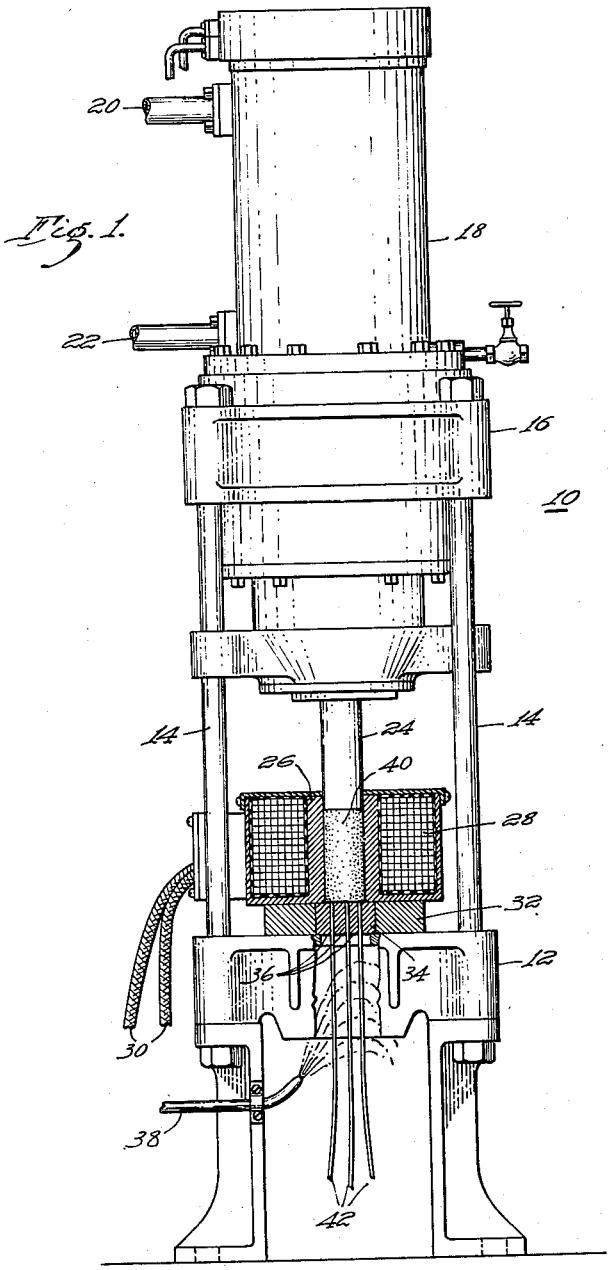
Figure 1 is an elevational view, partly in section, of an extrusion press.

Referring to Figure 1 of the drawings, the press 10 comprises a base 12, supporting rods 14 and a compression head 16, which mounts a hydraulic or other pressure cylinder 18. Within the pressure cylinder 18 is located a piston member (not shown) actuable by the pressure medium such as water or oil. Pressure fluid is admitted and exhausted through the conduits 20 and 22 connected to a suitable source of pressure and relief. An extrusion ram 24 is attached to the piston of the hydraulic cylinder. Generally the ram 24 is of cylindrical shape. The ram is made of a tool steel capable of withstanding compressive stresses of over 150,000 pounds per square inch without buckling or failing. The ram 24 closely fits a tool steel extrusion cylinder 26 capable of withstanding working stresses of the above order. Surrounding the extrusion cylinder 26 is a heating coil 28 to which are connected electrical conductors 30 capable of furnishing current of predetermined amount to produce any desired temperature in the coil 28. The heating coil 28 assures a predetermined temperature being maintained in the extrusion cylinder 26.

The bottom of the extrusion chamber is closed by a die-plate 32 containing a tool steel die of a material similar to that in the ram 24. The die 34 contains a plurality of shaped extrusion apertures 36 conforming to the cross-section of the strip desired. As shown, the die 34 contains three extrusion apertures 36. However, any number may be provided depending on the characteristics of the press and the alloy ingot being extruded. Immediately below the die and the base 12 is located a water sprinkling conduit 38 for effecting a rapid cooling of the extruded phosphorous copper strips.

An ingot 40 is shown within the extrusion cylinder 26 being operated upon by the ram 24. Three extruded strips 42 are shown as they are produced under the high pressures developed within the press. The stream of cold water impinges upon the strips 42 as soon as they leave the die block 34. It is desirable to effect rapid cooling of the strips 42 in order to prevent oxidation of the material by the atmosphere. In some instances air cooling will be satisfactory for this purpose and water cooling is not critical. The strips 42 may be cut off into predetermined length as they are being extruded.

The strips 42 produced by the extrusion press may be of any predetermined shape. Wire from $\frac{1}{16}$" diameter to $\frac{1}{4}$" diameter has been successfully produced on a press by simply varying the type of openings in the die block 34. Higher pressures are required to extrude the smaller size wire.

In order to effect the highest ductility in the extruded strip, it has been found that higher speeds of extrusion are more satisfactory for ingots kept at temperatures of 300° C. to 400° C. within the extrusion chamber. At temperatures above 600° C. the ingots should be subjected to slower extrusion speeds in order to prevent the wire or strip from melting as it is operated upon. The pressures required for extrusion approach 100,000 pounds per square inch at the low ingot temperatures around 400° C. Less pressure is required at the higher temperatures. The rod or strip produced in all cases has good ductility.

Figure 2:
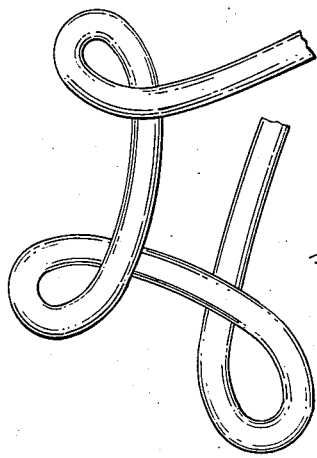
Fig. 2 is a plan view of a rod produced by the extrusion process after having been subjected to deformation.

Referring to Fig. 2 of the drawings, there is illustrated an enlarged view of a $\frac{1}{32}$" diameter extruded phosphorous copper wire made according to this invention. The wire has been twisted into a number of loops without any sign of failure. Such material is eminently suitable for numerous welding and brazing operations heretofore difficult or impossible of accomplishment with the hot rolled material.

Figure 3:
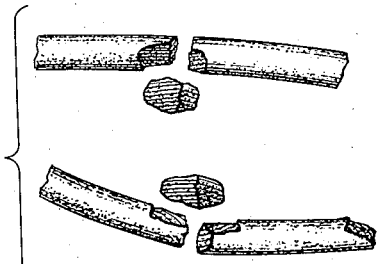
Fig. 3 is a plan view of a hot rolled wire after having been subjected to slight deformation.

In Fig. 3 of the drawings is shown enlarged views of the prior art hot rolled $\frac{1}{32}$" diameter phosphorous copper wire. Very slight deformation resulted in the material fracturing with a characteristic wedge-shaped fragment flying off at the compression side of the bend. Hot rolled phosphorous copper wire bent 10° to 15° exhibits this tendency to fly into pieces.

Figure 4:
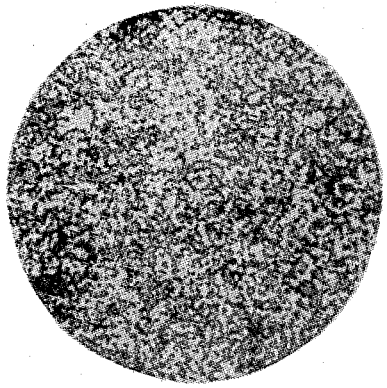
Fig. 4 is a photomicrograph at 500X of a cross-section of $\frac{3}{32}''$ diameter extruded phosphorous copper wire.
Figure 5:
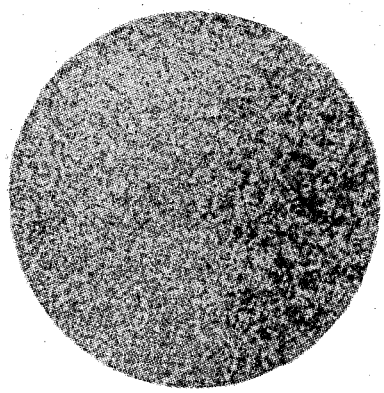
Fig. 5 is a photomicrograph at 500X of a cross-section of $\frac{3}{32}''$ diameter hot rolled phosphorous copper wire such as shown in Fig. 3.

In order to determine the difference in the characteristics of the materials obtained by the process of the invention and the prior art hot rolling process, photomicrographs were taken on a cross-section on $\frac{1}{32}$" diameter wire at a magnification of 500. Fig. 4 is a photomicrograph of the extruded phosphorous copper wire while Fig. 5 is a photomicrograph of the hot rolled material. As will be noticed, the crystalline structure of the extruded material is somewhat coarser than the hot rolled material. The white or lighter areas which correspond to the phosphide of copper are much more discontinuous in Fig. 4 than that shown in the Fig. 5 photomicrograph.

However, the photomicrographs do not give any conception of the remarkable ductility change effected by extrusion. Samples of hot rolled phosphorous copper wire and extruded phosphorous copper wire have been subjected to tensile tests and the respective elongation at the breaking point determined. The average of six samples of extruded phosphorous copper, which on analysis contained about 7% by weight of phosphorus, had an elongation of 18.35% in two inches when subjected to a tensile test. The average of six samples of similar representative samples of hot rolled phosphorous copper wire containing about 7% by weight phosphorus, when subjected to the same tensile test, had an elongation of 0.29% in two inches. The elongation of the extruded phosphorous copper is approximately sixty times that of hot rolled phosphorous copper. It is believed that this remarkable elongation in the extruded material indicates most clearly the extreme ductility of the material as contrasted to the prior art hot rolled phosphorous copper.

Referring again to Figs. 2 and 3, it will be noted that the material of Fig. 2 has a clean smooth surface. Fig. 3 shows a material which has rough pitted surface filled with oxide and scale which is an unprepossessing material to put on the market.

Certain commercial applications for the phosphorous copper alloy are available to the extruded phosphorous copper material having the ductility illustrated in Fig. 2 which were not available to the hot rolled alloy. Numerous piping and plumbing installations of the present day employed close fitting brass and copper piping and fittings. A few drops of solder are employed for effecting a tight joint between the pipe and fittings. However, when the pipe carries extremely hot fluids or high temperature steam, soft solders are unsatisfactory for the purpose since they melt at low temperatures. A higher temperature solder, such as phosphorous copper, is more suitable for such uses.

The extruded phosphorous copper is easily wound into a spiral on a mandrel and the spiral is cut into rings which may be applied to the joint between the pipe and fittings therefor. The application of heat will cause the rings to melt and flow into the joint and effect a seal which will withstand elevated temperatures. The hot rolled material could not be as readily or as economically made into ring form.

In the brazing and soldering of numerous types of apparatus, locations deep within the apparatus and not directly available may now be brazed by employing the ductile extruded phosphorous copper. The brazing strip or rod may be bent to go around corners, and upon application of the brazing flame, the molten material will be deposited adjacent to the joint to be made.

The extruded material is suitable not only for hard solder but is also satisfactory for electrical welding purposes where it may be employed either as a welding rod, with or without a coating, as well as a filler material in conjunction with a carbon arc. The ductility of the material permits its more effective application in this type of work. Difficult locations, such as deep, indirect corners, may be readily reached by bending the rod to go around obstructions.

It will be seen from the above that an ingot of phosphorous copper may be subjected to a single simple operation in which it is reduced to a predetermined shaped strip and given a ductility far beyond that obtainable in the prior art. This single operation reduces the cost of the material as well.

The amount of phosphorous in the copper may be varied to suit the desirable melting temperatures. Alloys containing 3% of phosphorous will melt slightly below 1000° C., while alloys containing approximately 10% phosphorus melt somewhat over 800° C. The alloys of phosphorus and copper having about 8% phosphorus or less are most suitable for brazing work due to their low melting temperatures and the relatively non-brittle characteristic of the solidified solder. The phosphorous copper alloy, upon melting and solidification, assumes the characteristics of the material which was possessed before extrusion. Accordingly, phosphorous copper alloys having from 2% to 10% phosphorus may be extruded to meet the requirements of commerce and industry.

Since certain changes may be made in the above invention and different embodiments of the invention could be made without departing from the scope thereof, it is intended that all matter contained in the above description or taken in connection with the accompanying drawings shall be interpreted as illustrative and not in a limiting sense.

I claim as my invention:

1. A brazing alloy comprising from 2% to 10% by weight of phosphorous, the balance being substantially copper, the alloy being extruded in a temperature range of from about 300° C. to a temperature sufficiently below the melting temperature of the alloy to maintain a consistency which will facilitate extrusion to give it ductility.

2. A smooth, scale-free brazing rod composed of an alloy of from 2% to 10% phosphorous by weight, the balance substantially copper, the alloy having been extruded in a temperature range of from about 300° C. to 675° C. to give a rod of predetermined shape and to impart to the rod ductility in order that the rod may be bent when cold.

3. A ductile brazing alloy comprising from 2% to 10% by weight of phosphorous, the balance being substantially all copper, the alloy being extruded in a temperature range of from about 300° C. to a temperature sufficiently below the melting temperature of the alloy to maintain a consistency which will facilitate extrusion to obtain a ductility corresponding to an elongation of up to 18% and over in two inches for a substantially 7% phosphorous-copper alloy when subjected to tensile stress.

4. A brazing alloy, comprising from 2% to 10% by weight of phosphorous, the balance being substantially all copper, extruded in a temperature range of from about 300° C. to a temperature sufficiently below the melting temperature of the alloy to maintain a consistency which will facilitate extrusion to a predetermined diameter to improve the ductility at least ten times.

5. A brazing alloy in rod form having a diameter of from $\frac{1}{16}$ inch to $\frac{1}{4}$ inch, the alloy comprising from 2% to 10% by weight of phosphorous, the balance being substantially all copper, the alloy being subjected only to extrusion in a temperature range of from about 300° C. to a temperature sufficiently below the melting temperature of the alloy to maintain a consistency which will facilitate extrusion to produce the rod and to improve the ductility at least ten times.

6. A ductile brazing rod of an alloy comprising from 2% to 10% by weight of phosphorous, the balance being substantially all copper, the alloy being subjected to extrusion in a temperature range of from about 300° C. to a temperature sufficiently below the melting temperature of the alloy to maintain a consistency which will facilitate extrusion to produce the brazing rod of predetermined diameter and a ductility corresponding to an elongation of at least ten times that of the same alloy hot rolled.

WALTER A. GRAHAM.